United States Patent
Sassatelli et al.

(10) Patent No.: US 9,068,459 B2
(45) Date of Patent: Jun. 30, 2015

(54) TURBINE DIAPHRAGM AIRFOIL, DIAPHRAGM ASSEMBLY, AND METHOD OF REPAIR

(75) Inventors: John Matthew Sassatelli, Valley Falls, NY (US); James Michael Kostrubanic, Burnt Hills, NY (US); Christopher Charles Krosky, Scotia, NY (US); Sheldon Dirk Westwood, Albany, NY (US)

(73) Assignee: General Electric Company, Schenectady, NY (US)

( * ) Notice: Subject to any disclaimer, the term of this patent is extended or adjusted under 35 U.S.C. 154(b) by 738 days.

(21) Appl. No.: 13/412,224

(22) Filed: Mar. 5, 2012

(65) Prior Publication Data

US 2013/0230403 A1 Sep. 5, 2013

(51) Int. Cl.
*F01D 5/14* (2006.01)
*B23P 6/00* (2006.01)
*F01D 5/00* (2006.01)
*F01D 5/28* (2006.01)
*F01D 9/04* (2006.01)

(52) U.S. Cl.
CPC ............ *F01D 5/005* (2013.01); *Y10T 29/49318* (2015.01); *F01D 5/28* (2013.01); *F01D 5/282* (2013.01); *F01D 9/04* (2013.01); *F05B 2230/232* (2013.01); *B23P 6/005* (2013.01)

(58) Field of Classification Search
CPC .................................. F01D 5/005; B23P 6/005
See application file for complete search history.

(56) References Cited

U.S. PATENT DOCUMENTS

| | | | |
|---|---|---|---|
| 3,650,635 A | 3/1972 | Wachtell et al. | |
| 4,611,744 A | 9/1986 | Fraser et al. | |
| 4,832,252 A | 5/1989 | Fraser | |
| 5,060,842 A | 10/1991 | Qureshi et al. | |
| 5,697,151 A | 12/1997 | Werner et al. | |
| 5,895,205 A | 4/1999 | Werner et al. | |
| 6,754,955 B1 | 6/2004 | Carl, Jr. et al. | |
| 7,985,046 B2 | 7/2011 | Gaul et al. | |
| 2005/0235492 A1 | 10/2005 | Arness et al. | |
| 2009/0313823 A1 | 12/2009 | Rockstroh et al. | |

FOREIGN PATENT DOCUMENTS

DE 19961565 A1 6/2001

OTHER PUBLICATIONS

Search Report and Written Opinion from PCT Application No. PCT/US2013/028982 dated Jun. 11, 2013.

*Primary Examiner* — Nathaniel Wiehe
*Assistant Examiner* — Brian O Peters
(74) *Attorney, Agent, or Firm* — Ernest G. Cusick; Hoffman Warnick LLC

(57) ABSTRACT

A turbine diaphragm airfoil, a turbine diaphragm assembly employing such an airfoil, and a method of repair are described. In one embodiment, a turbine diaphragm airfoil includes: a composite airfoil body which includes a pressure side and a suction side, the composite airfoil including: a leading edge section forming a portion of each of the pressure side and the suction side; and a trailing edge section integral with the leading edge section, the trailing edge section including: a prefabricated member affixed to the leading edge section, the prefabricated member forming a remainder of the pressure side of the composite airfoil body; and a weld or braze section contacting the leading edge section and the prefabricated member, the weld or braze section forming a remainder of the suction side of the composite airfoil body.

20 Claims, 3 Drawing Sheets

TURBINE DIAPHRAGM AIRFOIL, DIAPHRAGM ASSEMBLY, AND METHOD OF REPAIR

FIELD OF THE INVENTION

The subject matter disclosed herein relates to turbines. More specifically, the subject matter disclosed herein relates to turbine diaphragm airfoils and methods of repairing such airfoils.

BACKGROUND OF THE INVENTION

Turbine airfoils, e.g., steam turbine diaphragm airfoils, can be subject to harsh environmental conditions during operation of a turbine, including exposure to high-temperature, high-pressure and high-moisture content steam. These operating conditions, among others, can cause damage to the turbine airfoils (e.g., at the trailing edge or tip), such that the airfoils require repair.

Conventional approaches for repairing turbine diaphragm airfoils (or, turbine static nozzles) generally fall into two categories: a) an all-weld build-up followed by manual grinding to restore a desired profile; and b) a partial partition repair (PPR), where a precision machined airfoil section is welded to replace the entire trailing edge of the airfoil, and some hand machining is performed on the weld to fit the precision machined airfoil section with the remaining original section of the airfoil. These processes are performed while the turbine diaphragm airfoils are in place in the diaphragm. In these cases, the repair can be ineffective (e.g., in failing to restore the desired flow path), costly, or both.

BRIEF DESCRIPTION OF THE INVENTION

A turbine diaphragm airfoil, a turbine diaphragm assembly employing such an airfoil, and a method of repair are disclosed. In one embodiment of the invention a turbine diaphragm airfoil includes: a composite airfoil body which includes a pressure side and a suction side, the composite airfoil body including: a leading edge section forming a portion of each of the pressure side and the suction side; and a trailing edge section integral with the leading edge section, the trailing edge section including: a prefabricated member affixed to the leading edge section, the prefabricated member forming a remainder of the pressure side of the composite airfoil body; and a weld or braze section contacting the leading edge section and the prefabricated member, the weld or braze section forming a remainder of the suction side of the composite airfoil body.

A first aspect of the invention includes a turbine diaphragm airfoil having: a composite airfoil body which includes a pressure side and a suction side, the composite airfoil body including: a leading edge section forming a portion of each of the pressure side and the suction side; and a trailing edge section integral with the leading edge section, the trailing edge section including: a prefabricated member affixed to the leading edge section, the prefabricated member forming a remainder of the pressure side of the composite airfoil body; and a weld or braze section contacting the leading edge section and the prefabricated member, the weld or braze section forming a remainder of the suction side of the composite airfoil body.

A second aspect of the invention includes a turbine diaphragm assembly including: an inner diaphragm sidewall; an outer diaphragm sidewall; and a plurality of diaphragm airfoils located between the inner diaphragm sidewall and the outer diaphragm sidewall, each of the plurality of diaphragm airfoils having: a composite airfoil body having a pressure side and a suction side, the composite airfoil body including: a leading edge section forming a portion of each of the pressure side and the suction side; and a trailing edge section integral with the leading edge section, the trailing edge section including: a prefabricated member affixed to the leading edge section, the prefabricated member forming a remainder of the pressure side of the composite airfoil body; and a weld or braze section contacting the leading edge section and the prefabricated member, the weld or braze section forming a remainder of the suction side of the composite airfoil body.

A third aspect of the invention includes a method of repairing a turbine airfoil in a turbine diaphragm, the method including: affixing a prefabricated member to the turbine airfoil having a pressure side with a portion missing therefrom and a suction side with a portion missing therefrom, the prefabricated member replacing the portion missing from the pressure side of the turbine airfoil; and welding or brazing along a suction side of the prefabricated member to replace the portion missing from the suction side of the airfoil.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
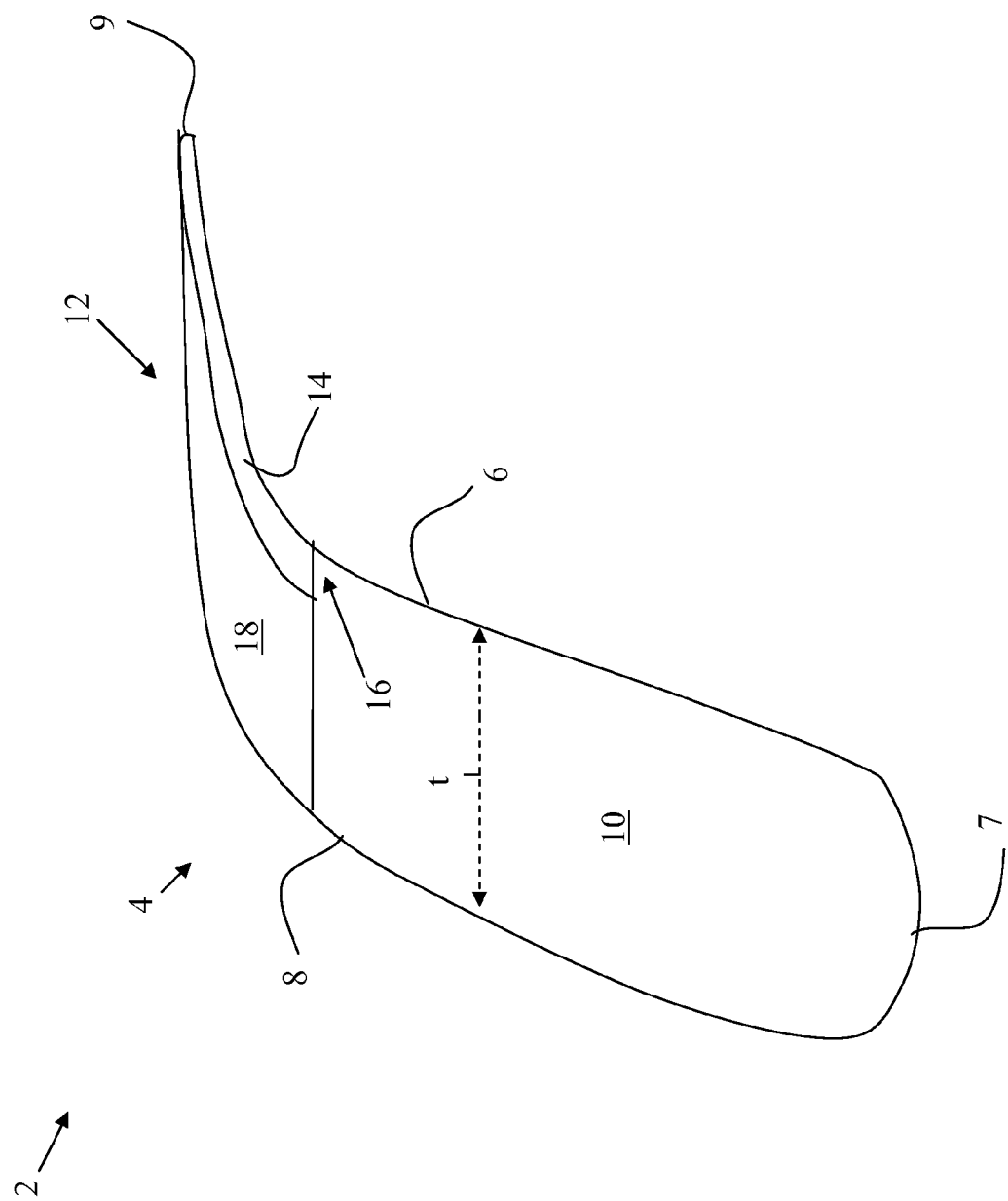
FIG. 1 shows a schematic side view of a turbine diaphragm airfoil according to various embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The subject matter disclosed herein relates to turbines. More specifically, the subject matter disclosed herein relates to turbine diaphragm airfoils, turbine diaphragms employing those airfoils, and methods of repairing such airfoils.

Steam turbine diaphragms conventionally include a plurality of stationary nozzle airfoils (also called "partitions"), which direct the flow of a working fluid toward the dynamic buckets of the turbine's rotor. During operation of a conventional steam turbine system including a diaphragm and a rotor, the nozzle airfoils can be exposed to steam at extremely high temperatures for extended periods, as well as boiler particle carry-over and solid particle erosion. These temperatures and particle exposure may wear the nozzle airfoils, causing those nozzle airfoils to erode. In particular, one or more nozzle airfoils can erode proximate its trailing edge, or "finned" portion, diminishing that nozzle airfoil's ability to direct fluid flow in the turbine. These nozzle airfoils may require periodic repair as a result.

As noted herein, conventional approaches for repairing steam turbine diaphragm airfoils generally fall into two categories: a) an all-weld build-up followed by manual grinding to restore a desired profile; and b) a partial partition repair (PPR), where a precision machined airfoil section is welded to replace the entire trailing edge of the airfoil, and some hand machining is performed on that weld to fit the precision machined airfoil section with the remaining original section of the airfoil. These processes are performed while the turbine diaphragm airfoils are in place in the diaphragm. In both cases, the repair can be ineffective (e.g., in failing to restore the desired flow path), too costly, or both.

In the first approach, because portions of the diaphragm airfoils are not visible and/or are difficult to reach during the machining process (e.g., during grinding and finishing of the profile), the weld can be imprecise and require arduous follow-up work. In the second approach, the cost of precision machining the entire trailing edge of the airfoil can be undesirably costly.

In contrast to these conventional approaches and the resulting turbine diaphragm airfoils, various aspects of the invention include a turbine diaphragm airfoil having: a composite airfoil body which includes a pressure side and a suction side, the composite airfoil body including: a leading edge section forming a portion of each of the pressure side and the suction side; and a trailing edge section integral with the leading edge section, the trailing edge section including: a prefabricated member affixed to the leading edge section, the prefabricated member forming a remainder of the pressure side of the composite airfoil body; and a weld or braze section contacting the leading edge section and the prefabricated member, the weld or braze section forming a remainder of the suction side of the composite airfoil body.

In various other embodiments of the invention, a turbine diaphragm assembly is disclosed including: an inner diaphragm sidewall; an outer diaphragm sidewall; and a plurality of diaphragm airfoils located between the inner diaphragm sidewall and the outer diaphragm sidewall, each of the plurality of diaphragm airfoils having: a composite airfoil body having a pressure side and a suction side, the composite airfoil body including: a leading edge section forming a portion of each of the pressure side and the suction side; and a trailing edge section integral with the leading edge section, the trailing edge section including: a prefabricated member affixed to the leading edge section, the prefabricated member forming a remainder of the pressure side of the composite airfoil body; and a weld or braze section contacting the leading edge section and the prefabricated member, the weld or braze section forming a remainder of the suction side of the composite airfoil body.

In yet other embodiments of the invention, a method of repairing a turbine airfoil in a turbine diaphragm is disclosed, the method including: affixing a prefabricated member to the turbine airfoil having a pressure side with a portion missing therefrom and a suction side with a portion missing therefrom, the prefabricated member replacing the portion missing from the pressure side of the turbine airfoil; and welding or brazing along a suction side of the prefabricated member to replace the portion missing from the suction side of the airfoil.

Turning to FIG. 1, a schematic side view of a turbine diaphragm airfoil 2 is shown according to various embodiments of the invention. The turbine diaphragm airfoil 2 can be configured for use in a turbine diaphragm, for example a steam turbine diaphragm. In some cases, the turbine diaphragm airfoil 2 is referred to as a "diaphragm partition", or simply a "partition" or an "airfoil" herein.

As shown, the diaphragm airfoil 2 can include a composite airfoil body 4 having a pressure side 6 and a suction side 8. The airfoil body 4 can further include a leading edge 7 and a trailing edge 9. During operation of a steam turbine employing the diaphragm airfoil 2, inlet steam is directed from the leading edge 7, across the pressure side 6 of the diaphragm airfoil 2 toward the trailing edge, and eventually, toward the dynamic blades of the turbine's rotor. As shown, the airfoil body 4 can include a leading edge section 10 which forms a portion of each of the pressure side 6 and the suction side 8 of the airfoil body 4. Also shown, is a trailing edge section 12, which is integral with the leading edge section 10, and which forms the remainder of the pressure side 6 and the suction side 8, respectively. The leading edge section 10 can include a metal (e.g., steel, aluminum, etc.) conventionally used in forming a diaphragm airfoil. In some cases, the leading edge section 10 can be formed from a steel such as AISI (American Iron and Steel Institute Standard) 410. The leading edge section 10 is an originally formed portion of the diaphragm airfoil 2, which may not necessarily require repair according to the embodiments described herein. That is, the leading edge section 10 includes original portions of a diaphragm airfoil which will remain substantially in tact according to the methods of the invention.

The trailing edge section 12 can be formed of a two-part composite, which includes a prefabricated member 14 affixed to the leading edge section (e.g., at a seam 16). The prefabricated member 14 can be welded or brazed to leading edge section 10 at seam 16, or can be otherwise affixed to the leading edge section 10, e.g., via adhesive or other attachment mechanism. In some embodiments, the seam 16 can be left unwelded but otherwise affixed to the leading edge section 10. In other cases, the seam 16 can be substantially fully fused with the leading edge section 10 via a full penetration weld (or braze) along the seam 16. In various embodiments of the invention, the seam 16 can extend only a portion of the thickness (t) of the leading edge section 10. In some cases, the seam 16 (and hence, the thickness of the prefabricated member 14), is approximately between 0.06 inches and 0.13 inches. In a particular case, the seam is approximately 0.09 inches thick. In various embodiments, the seam 16 spans approximately 10-20 percent of the thickness (t) of the leading edge section 10. The prefabricated member 14 can include any conventional metal used in forming an airfoil, e.g., steel, aluminum, copper, etc. In some cases, the prefabricated member 14 can be composed of a substantially similar material (e.g., a metal) as the leading edge section 10.

The prefabricated member 14, as its name suggests, is formed prior to being affixed to the leading edge section 10. In some cases, the prefabricated member 14 can be fabricated at a location remote from the location where the prefabricated member 14 is affixed to the leading edge section. In other cases, the prefabricated member 14 can be fabricated on-site. In any case, the prefabricated member 14 can form a remainder of the pressure side 6 of the diaphragm airfoil 2, such that the prefabricated member 14 can replace a portion (e.g., a damaged portion) of an original airfoil along a portion of the pressure side 6. In particular, the prefabricated member 14 can replace the damaged portion of an original airfoil along its pressure side 6, in particular, proximate its trailing edge. As shown, the trailing edge section 12 can further include a weld or braze section 18 contacting the leading edge section 10 and the prefabricated member 14. In some cases, the weld or braze section 18 forms a remainder of the suction side 8 of the diaphragm airfoil 2. That is, as in the case of the pressure side 6 of the diaphragm airfoil 2, the weld or braze section 18 can form a repaired portion of an incomplete diaphragm airfoil, which can replace a removed, original section of the airfoil 2 proximate its trailing edge (e.g., trailing edge 9).

Figure 2:
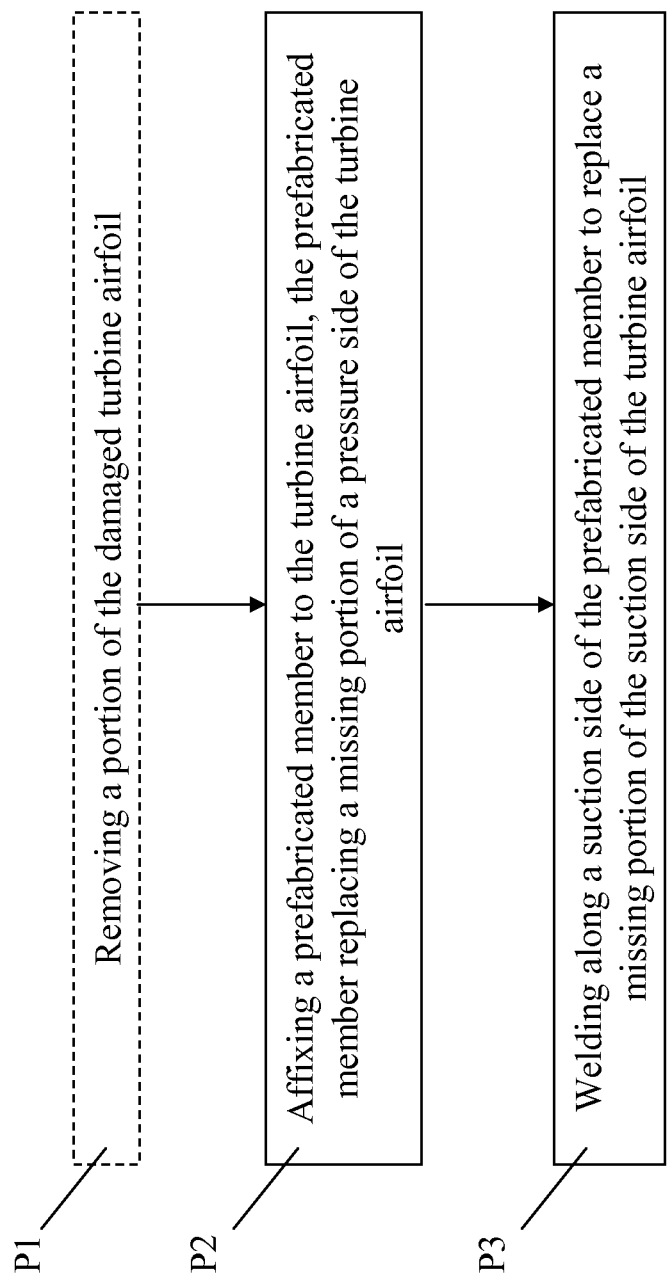
FIG. 2 shows a flow chart illustrating a process according to various embodiments of the invention.

FIG. 2 shows an illustrative flow diagram including processes according to various embodiments of the invention.

With continuing reference to FIG. 1, a preliminary (optional) process P1 can include removing a portion of the turbine airfoil (e.g., proximate the trailing edge 9), which can be damaged due to any number of conditions described herein. Removing of this portion of the turbine airfoil can include cutting the portion from the remaining portion (e.g., the leading edge section) in situ. As used herein, the term "in situ" refers to the location of a turbine airfoil within a diaphragm assembly, as is further described with reference to FIG. 3. In any case, process P1 can include removing a portion of the turbine airfoil, which can include cutting, sanding, machining or otherwise separating a damaged portion from a relatively undamaged (incomplete) portion of the airfoil. In some case, the removed damaged portion can span from the pressure side (e.g., pressure side 6) to the suction side (8) of the turbine airfoil 2, such that it extends through a depth of the turbine airfoil 2. After removing the desired portion of the damaged airfoil, an incomplete airfoil remains.

Figure 3:
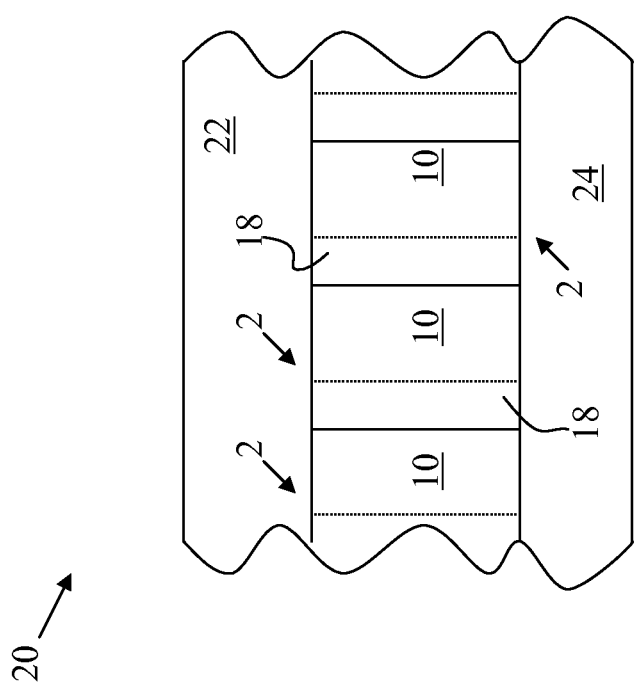
FIG. 3 shows a schematic plan view of a portion of a turbine diaphragm assembly according to various embodiments of the invention.

With continuing reference to FIG. 2, process P2 can include affixing a prefabricated member (e.g., prefabricated member 14) to the turbine airfoil (e.g., after removal of the desired damaged portion). The prefabricated member 14 can replace the missing portion of the pressure side of the turbine airfoil. As will be shown with greater clarity with reference to FIG. 3, the prefabricated member 14 is placed into a position while the airfoil 4 is in situ (in a diaphragm assembly). The prefabricated member 14 can be affixed via an adhesive, or via a welding technique including at least one of metal-inert-gas (MIG) welding or tungsten-inert-gas (TIG) welding. It is understood that the prefabricated member 14 could alternatively be brazed to the turbine airfoil (e.g., after removal of the desired damage portion). It is further understood that the prefabricated member 14 can be full-penetration welded or brazed to both of the conventional sidewalls (e.g., inner and outer diaphragm rings 22 and 24, respectively, which are shown in FIG. 3) as well as to the leading edge section 10. This creates a 3-sided weld or braze connection between the prefabricated member 14 and the finished nozzle assembly (FIG. 3). In some embodiments, as shown in FIG. 1, the prefabricated member 14 and the leading edge section 10 collectively form a substantially continuous (or, uninterrupted) profile along the pressure side 6 of the composite airfoil 2.

It is understood that in various embodiments, process P2 can include welding or brazing portions of the prefabricated member 14 to sidewalls in an integrated airfoil/sidewall (also referred to as "singlet") configuration. In this case, as is known in the art, the singlet includes a substantially integrally formed airfoil and sidewalls. In this type of configuration, process P2 could include using a full-penetration weld or braze to join the prefabricated member 14 with one or both of the sidewalls as well as the leading edge section 10.

Following affixing of the prefabricated member 14 to the leading edge section 10, process P3 can include welding or brazing along a suction side of the prefabricated member 14 to replace a missing portion of the suction side of the damaged airfoil. That is, with continuing reference to FIG. 1, this process can include welding or brazing to build a portion of the suction side (e.g., suction side 8) on the "back" of the prefabricated member 14. In some cases, this weld or braze build-up can be performed starting proximate to the seam 16 of the prefabricated member and the leading edge section 10, and in some cases the weld or braze build-up can be performed continuously to form the weld or braze section 18 as shown in FIG. 1. In various embodiments, the welding or brazing process is performed continuously until the missing portion of the suction side of the damaged airfoil is substantially restored. More particularly, in various embodiments, the welding or brazing process is extended to form an overbuilt weld or braze section which can be machined back to form the weld or braze section 18 as shown in FIG. 1. In some cases, the weld build-up can be performed using one or more welding techniques such as metal-inert-gas (MIG) welding or tungsten-inert-gas (TIG) welding. As shown in FIG. 1, following process P3 and any follow-up machining/cleaning of the weld or braze section 18 and the leading edge section 10 collectively form a substantially continuous (or, uninterrupted) profile along the suction side 8 of the composite airfoil 2.

That is, following performing of the processes described according to various embodiments of the invention, a substantially restored airfoil body 4 is provided, having substantially continuous profiles on both its pressure side 6 and suction side 8. It is understood that the processes described herein can be performed in any order, and that some processes may be omitted, without departing from the spirit of the invention described herein.

Turning to FIG. 3 a schematic plan view of a portion of a turbine diaphragm assembly 20 is shown according to various embodiments of the invention. The turbine diaphragm assembly 20 can include an inner diaphragm sidewall 22 (e.g., a portion of a diaphragm ring or a group of one or more singlet sidewalls shown), an outer diaphragm sidewall 24 (e.g., a part of a ring or a group of one or more singlet sidewalls shown), and a plurality of diaphragm airfoils 2 located between the inner diaphragm sidewall 22 and the outer diaphragm sidewall 24. Each of the plurality of diaphragm airfoils 2 can include features similarly described with respect to the identically numbered airfoil of FIG. 1. It is understood that a complete diaphragm assembly 20 can be formed as any conventional diaphragm assembly, e.g., in semi-circular sections joined at a horizontal joint surface. FIG. 3 illustrates the in-situ environment in which the methods according to various embodiments of the invention are performed. That is, as shown, the pressure side 6 of each diaphragm airfoil 2 is not visible from this perspective, and that pressure side 6 is also difficult to reach due to the limited clearance between adjacent diaphragm airfoils 2.

As noted herein, various embodiments of the invention can be applied to a singlet nozzle configuration as well as a more traditional diaphragm ring configuration. As is known in the art, the diaphragm ring configuration employs an inner and outer diaphragm ring having airfoils extending therebetween, where the airfoils (e.g., airfoil 2) can be individually welded (or brazed) into slots, grooves or connecting points on each of the inner and outer diaphragm rings, respectively. In contrast, the singlet nozzle configuration employs sidewalls (e.g., sidewall sections) which are integrally cast with the airfoil (e.g., airfoil 2). The sidewalls in these embodiments can be placed in slots (e.g., at least partially axially extending slots) in a ring assembly. In either case, various embodiments of the invention allow for affixing (e.g., welding or brazing) a prefabricated section of the airfoil to both sidewalls (e.g., ring or singlet sidewall).

As will be appreciated by one having skill in the art, various embodiments of the invention can provide for more effective repair of diaphragm airfoils when compared with the conventional approaches. By inserting a prefabricated member into a portion of the repair path where visibility and maneuverability are diminished, the profile along the pressure side of the repaired airfoil is improved when compared with the conventional all-weld build-up approach. Further, the time and cost associated with a complete weld build-up is reduced, saving man-hours when compared with that conventional approach.

Additionally, using the weld or braze build-up on the visible (and more easily reached) suction side of the repaired airfoil provides a cost benefit when compared with the conventional partial partition repair (PPR) insert approach.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A turbine diaphragm airfoil comprising:
   a composite airfoil body having a pressure side and a suction side, the composite airfoil body including:
   a leading edge section forming a portion of each of the pressure side and the suction side; and
   a trailing edge section integral with the leading edge section, the trailing edge section including:
   a prefabricated member affixed to the leading edge section, the prefabricated member forming a remainder of the pressure side of the composite airfoil body; and
   a weld or braze section contacting the leading edge section and the prefabricated member, the weld or braze section forming a remainder of the suction side of the composite airfoil body and extending from the leading edge section to approximately a trailing edge of the composite airfoil body.

2. The turbine diaphragm airfoil of claim 1, wherein the leading edge section includes an original metal.

3. The turbine diaphragm airfoil of claim 1, wherein the prefabricated member includes a metal of a substantially similar composition as the leading edge section.

4. The turbine diaphragm airfoil of claim 3, wherein the prefabricated member and the leading edge section are joined at a seam extending only a portion of a thickness of the leading edge section and the prefabricated member extends from the seam to the trailing edge of the composite airfoil body.

5. The turbine diaphragm airfoil of claim 1, wherein the prefabricated member and the leading edge section collectively form a substantially continuous profile along the pressure side of the composite airfoil body.

6. The turbine diaphragm airfoil of claim 1, wherein the weld or braze section and the leading edge section collectively form a substantially continuous profile along the suction side of the composite airfoil body.

7. The turbine diaphragm airfoil of claim 1, wherein the weld or braze section forms the entire remainder of the suction side of the composite airfoil body extending from the leading edge section to the trailing edge of the composite airfoil body.

8. A turbine diaphragm assembly comprising:
   an inner diaphragm sidewall;
   an outer diaphragm sidewall; and
   a plurality of diaphragm airfoils located between the inner diaphragm sidewall and the outer diaphragm sidewall, each of the plurality of diaphragm airfoils having:
   a composite airfoil body having a pressure side and a suction side, the composite airfoil body including:
   a leading edge section forming a portion of each of the pressure side and the suction side; and
   a trailing edge section integral with the leading edge section, the trailing edge section including:
   a prefabricated member affixed to the leading edge section, the prefabricated member forming a remainder of the pressure side of the composite airfoil body; and
   a weld or braze section contacting the leading edge section and the prefabricated member, the weld or braze section forming a remainder of the suction side of the composite airfoil body and extending from the leading edge section to approximately a trailing edge of the composite airfoil body.

9. The turbine diaphragm assembly of claim 8, wherein the leading edge section includes an original metal.

10. The turbine diaphragm assembly of claim 8, wherein the prefabricated member includes a metal of a substantially similar composition as the leading edge section.

11. The turbine diaphragm assembly of claim 10, wherein the prefabricated member and the leading edge section are joined at a seam extending only a portion of a thickness of the leading edge section and the prefabricated member extends from the seam to the trailing edge of the composite airfoil body.

12. The turbine diaphragm assembly of claim 8, wherein the prefabricated member and the leading edge section collectively form a substantially continuous profile along the pressure side of the composite airfoil body.

13. The turbine diaphragm assembly of claim 8, wherein the weld or braze section and the leading edge section collectively form a substantially continuous profile along the suction side of the composite airfoil body.

14. A method of repairing a turbine airfoil in a turbine diaphragm, the method comprising:
   affixing a prefabricated member to the turbine airfoil, the turbine airfoil having a pressure side with a portion missing therefrom and a suction side with a portion missing therefrom, the prefabricated member replacing the portion missing from the pressure side of the turbine airfoil; and
   welding or brazing along a suction side of the prefabricated member to replace the portion missing from the suction side of the airfoil,
   wherein the welding or brazing along the suction side of the prefabricated member includes welding or brazing along substantially the entire suction side of the prefabricated member to a trailing edge of the turbine airfoil.

15. The method of claim 14, wherein the prefabricated member and the turbine airfoil form a substantially continuous surface after the affixing and the welding or brazing.

16. The method of claim 14, wherein the prefabricated member includes at least one of steel, aluminum or copper.

17. The method of claim 14, wherein the welding or brazing includes welding, the welding including at least one of metal-inert-gas (MIG) welding or tungsten-inert-gas (TIG) welding.

18. The method of claim 14, further comprising removing a portion of the turbine airfoil prior to the affixing of the prefabricated member to the turbine airfoil.

19. The method of claim 14, wherein the welding or brazing is performed substantially continuously until the portion missing from the suction side of the airfoil is substantially restored.

20. The method of claim 14, wherein the welding or brazing along the suction side of the prefabricated member includes welding or brazing along the entire suction side of the prefabricated member to the trailing edge of the turbine airfoil.

\* \* \* \* \*